US009860165B2

(12) United States Patent
Zou (10) Patent No.: US 9,860,165 B2
(45) Date of Patent: *Jan. 2, 2018

(54) METHOD AND APPARATUS FOR DETECTING AND AVOIDING INTERFERENCE IN A COMMUNICATIONS NETWORK

(71) Applicant: Aruba Networks, Inc., Sunnyvale, CA (US)

(72) Inventor: Xu Zou, San Jose, CA (US)

(73) Assignee: ARUBA NETWORKS, INC., Sunnyvale, CA (US)

(*) Notice: Subject to any disclaimer, the term of this patent is extended or adjusted under 35 U.S.C. 154(b) by 141 days.

This patent is subject to a terminal disclaimer.

(21) Appl. No.: 14/258,844

(22) Filed: Apr. 22, 2014

(65) Prior Publication Data

US 2014/0226672 A1 Aug. 14, 2014

Related U.S. Application Data

(63) Continuation of application No. 11/986,158, filed on Nov. 20, 2007, now Pat. No. 8,718,561.

(51) Int. Cl.
| | | |
|---|---|---|
| H04L 12/721 | (2013.01) | |
| H04L 12/707 | (2013.01) | |
| H04W 36/06 | (2009.01) | |
| H04L 27/00 | (2006.01) | |

(52) U.S. Cl.
CPC .............. *H04L 45/70* (2013.01); *H04L 45/24* (2013.01); *H04W 36/06* (2013.01); *H04L 27/0006* (2013.01)

(58) Field of Classification Search
USPC ..... 455/403, 423, 450, 452.2, 464; 370/310, 370/329, 332
See application file for complete search history.

(56) References Cited

U.S. PATENT DOCUMENTS

| | | |
|---|---|---|
| 5,884,145 A | 3/1999 | Haartsen |
| 5,956,638 A | 9/1999 | Chang et al. |
| 6,256,477 B1 | 7/2001 | Eidson et al. |

(Continued)

FOREIGN PATENT DOCUMENTS

| | | |
|---|---|---|
| CN | 1462523 A | 12/2003 |
| CN | 1738276 A | 2/2006 |
| WO | WO-2006/045097 A2 | 4/2006 |

OTHER PUBLICATIONS

International Search Report and Written Opinion, International Application No. PCT/US2008/083081, dated Jan. 2, 2009, pp. 1-5.

(Continued)

*Primary Examiner* — Nay A Maung
*Assistant Examiner* — Erica Fleming-Hall
(74) *Attorney, Agent, or Firm* — Hewlett Packard Enterprise Patent Department (57) ABSTRACT

A wireless mesh communication network includes a plurality of wireless routers which can be managed in a hierarchical manner with respect to one another and all of the routers are capable of detecting and avoiding interference on channels over which they communicate with one another. Depending upon whether a channel is active or inactive, a wireless router can either passively detect interference and then switch channels to avoid it or actively detect interference and then switch channels to avoid it.

20 Claims, 9 Drawing Sheets

(56) References Cited

U.S. PATENT DOCUMENTS

| | | | |
|---|---|---|---|
| 6,434,132 B1* | 8/2002 | Ishii | H04L 69/40 370/338 |
| 7,206,840 B2* | 4/2007 | Choi | H04W 36/06 370/333 |
| 2002/0060995 A1* | 5/2002 | Cervello | H04W 72/02 370/332 |
| 2002/0188723 A1* | 12/2002 | Choi | H04W 36/06 709/225 |
| 2003/0050012 A1 | 3/2003 | Black et al. | |
| 2004/0213189 A1* | 10/2004 | Alspaugh | H04L 12/5601 370/338 |
| 2005/0013275 A1 | 1/2005 | Black et al. | |
| 2005/0032537 A1 | 2/2005 | Miyashita | |
| 2005/0153667 A1 | 7/2005 | Cave et al. | |
| 2005/0192037 A1 | 9/2005 | Nanda et al. | |
| 2006/0135191 A1* | 6/2006 | Matsui | H04B 17/309 455/515 |
| 2006/0176844 A1 | 8/2006 | Ogura | |
| 2006/0215582 A1* | 9/2006 | Castagnoli | H04L 45/02 370/254 |
| 2006/0217137 A1* | 9/2006 | Kushalnagar | H04B 17/345 455/501 |
| 2006/0281412 A1 | 12/2006 | Skafidas et al. | |
| 2007/0076596 A1* | 4/2007 | Roy | H04W 36/06 370/228 |
| 2007/0091813 A1 | 4/2007 | Richard et al. | |
| 2007/0104139 A1 | 5/2007 | Marinier et al. | |
| 2007/0105501 A1 | 5/2007 | Shen et al. | |
| 2007/0160020 A1* | 7/2007 | Osann | H04L 45/24 370/338 |
| 2007/0258508 A1* | 11/2007 | Werb | H04W 84/18 375/140 |
| 2007/0280155 A1* | 12/2007 | Le | C07D 301/06 370/328 |
| 2008/0019334 A1 | 1/2008 | Adams et al. | |
| 2008/0102845 A1 | 5/2008 | Zhao | |
| 2008/0146155 A1* | 6/2008 | Makhlouf | H04W 16/14 455/63.1 |
| 2008/0175210 A1* | 7/2008 | Jamieson | H04W 24/10 370/338 |
| 2008/0188194 A1 | 8/2008 | Liu | |
| 2008/0225809 A1 | 9/2008 | Guo | |
| 2008/0233954 A1 | 9/2008 | Ibrahim et al. | |
| 2008/0293404 A1 | 11/2008 | Scherzer et al. | |
| 2009/0003239 A1 | 1/2009 | Campbell | |
| 2009/0109855 A1* | 4/2009 | Gong | H04W 16/10 370/238 |
| 2009/0285116 A1 | 11/2009 | Nanda et al. | |

OTHER PUBLICATIONS

Office Action, CN Application No. 201310031425.4, dated Jan. 27, 2016, pp. 1-7.

* cited by examiner

METHOD AND APPARATUS FOR DETECTING AND AVOIDING INTERFERENCE IN A COMMUNICATIONS NETWORK

BENEFIT CLAIM; INCORPORATION BY REFERENCE; DISCLAIMER

This application is a Continuation of application Ser. No. 11/986,158 filed on Nov. 20, 2007, which is hereby incorporated by reference.

FIELD OF THE INVENTION

The invention relates generally to the area of radio frequency in a wireless communications network and specifically to how such interference is detected and avoided.

The Applicant hereby rescinds any disclaimer of claim scope in the parent application or the prosecution history thereof and advice the USPTO that the claims in this application may be broader than any claim in the parent application.

BACKGROUND OF THE INVENTION

Electromagnetic interference, which is also referred to as radio frequency interference (RFI), is prevalent in the environment in which wireless communications networks operate and can be the primary cause of unacceptably noisy communication sessions or worse, the cause of dropped calls. Depending upon the frequency band in which the wireless communications network operates, different types of devices can be the source of such RFI. RFI can be emitted by radar devices and by wireless communications devices such as cell phones, WiFi devices such as wireless routers or wireless phones. Such RFI emissions can disrupt the operation of communication networks operating in the same frequency band as the emitted RFI. If the level of RFI rises above a particular threshold during the course of a communication session, the quality of the communication session or the ability of a wireless communication device to maintain the session can become problematical. Such RFI can manifest itself as noise or static sound as witnessed by the user of the wireless communication device or it can manifest itself as the loss of a signal to or from the wireless communication device.

A wireless communication network, such as a wireless mesh network, is typically employed in environments where it is not practical to install a wired infrastructure network. Generally speaking, a wireless, mesh network architecture is composed of a plurality of wireless routers, each of which are arranged in space to create a "cell". A wireless mesh network is designed so that no single point of failure in the network can fatally disrupt network communications. Typically, a router in a wireless mesh network will be connected to two or more other wireless routers within range and each of the routers can incorporate some intelligence that permits it to at least temporarily re-route traffic to another router if the link over which it is currently sending traffic fails for some reason. In the event that a link fails, it is possible in a mesh network to avoid the failed mesh network link by changing the channel over which the traffic was being transmitted prior to the link failing. In this manner, the previous traffic flow between two routers can be restored with the result that the mesh network infrastructure is most efficiently utilized. More specifically, in the event that a link between two routers fails, any subsequent re-routing of traffic will have an effect on the flow of traffic through at least those routers directly linked to the router the traffic is routed away from and possibly all routers in the network. Since mesh networks are designed to provide a channel allocation scheme that optimizes the flow of traffic through the network, any single failure of a communication link between two routers may cause some or all of the other routers in the network to switch the channels over which they are transmitting and/or receiving traffic in order to re-optimize the flow of traffic through the network. As mentioned, a major cause of such communication link failure is RFI and so it is crucial to the operation of a wireless mesh network that RFI can be detected before it causes the failure of any particular communication link.

A number of different methods have been employed in wireless communications devices utilized in wireless communication networks that effectively detect the RFI mentioned above. One method for detecting RFI is to include a second transceiver in each wireless communication device that is dedicated to passively scanning the wireless medium on channels utilized by the wireless communications network. This second, dedicated transceiver maintains a listing of all channel scanned and the level of RFI on each channel. Using this approach, when unacceptable levels of RFI are experienced on a particular channel, the wireless communications device can switch to a channel that currently has an acceptable level of RFI. While the approach of including a second, dedicated transceiver in a single wireless communications works fine, the additional cost of including a second transceiver in a wireless communications device can be prohibitive.

Another method which can be employed to detect RFI is to configure two or more wireless communications devices in the same wireless communications network to periodically send a short message to each other and to use the frame lose ratio and the frame retry ratio to indirectly reflect the level of RFI that exists on a particular channel. While this approach has little impact on the bandwidth available for supporting a communications session on any of the wireless communications devices, it does not detect RFI directly and the causes for the packet lose or retry could literally be in the thousands, RFI being only one of the causes.

Another method which can be employed by a wireless communication device to detect RFI is to configure the wireless communication device to periodically switch its transceiver from the active mode of operation to the passive mode of operation and have the device monitor the different channels to determine the level of RFI on each. While this method does directly detect the level of RFI on each channel at the physical level, it adversely affects the bandwidth that would otherwise be available for communication sessions. So for example, while in the passive mode, the wireless communication device may not be able to receive or to transmit messages, which creates obvious problems.

Published United States patent application no. 2007/0147236 A1 describes a method of detecting and avoiding interference in a wireless network. Specifically, starting on page 2 in paragraph 41 is a description of a five step method for detecting and avoiding interference in a wireless network. The first step is to observe the average packet drop rate that exists in a wireless network and to store this average drop rate on a wireless communications device that uses the network. This drop rate is used as a base-line interference level. The second step is to send and receive messages during idle network times and to compare the packet drop rate with the stored packet drop rate. The third step is to observe OFDM signal activity during the Clear Channel Assessment (CCA) time or other unreserved time slot period and stores information that indicates which channel(s) have no activity. In the forth step, if the wireless device detects UWB signals during the unreserved time slot times, it determines that any excessive packet drop rate is due to interference with another UWB network and can switch to another channel. In step 5, if the wireless device does not detect any UWB signals in step 3, it determines that it is causing the interference and can switch channels.

Although the interference detection and avoidance method described above with reference to application no. 2007/0147236 A1 works fine for a communication device in a standard wireless network, this method is only applicable to an arrangement where a wireless communication device is connected to a single, wireless network access point. Further, this method is not applicable to a wireless mesh network populated by a plurality of wireless routers that operate in concert to provide the optimal path for a plurality of traffic flows through the network. Nor does this method apply to a network that has the capability to re-route traffic in an optimal fashion in the event that one or more communication links between the network routers fail. Nor does this method apply to a network that has the capability to generate, after one or more communication links have failed, a scheme for network channel usage that re-optimizes the flow of traffic through the network.

SUMMARY OF THE INVENTION

A method and apparatus for detecting and avoiding interference in a wireless communication network is described that in one embodiment includes a first network node that detects the absence of a regularly occurring signal for a pre-determined period of time that is regularly transmitted by a second network node and the detected absence of this regularly occurring signal triggers the first network node to initiate an interference detection process while a communication link between the first and second network nodes is active; the first network node after detecting interference above a pre-determined threshold then sends a channel switch message that is routed to a root parent node; the root parent node receives the channel switch message and selects the best channel to switch to and responds by sending a channel switch message that is routed to all of the children nodes in the network; the children nodes receiving the channel switch message and immediately switching to the channel indicated in the channel switch message; and in the event that the channel over which the first network node is communicating fails, the parent node sensing the medium for a least one suitable channel; the parent node sending a channel switch request message that includes at least one suitable channel that is routed to the root parent node; the root parent node receiving the channel switch request message and selecting the best channel from among all of the suitable channels and responding by sending a channel switch message that is routed to all of the children nodes in the network; all of the children nodes receiving the channel switch message and immediately switching to the channel indicated in the channel switch message.

DETAILED DESCRIPTION OF THE INVENTION

Wireless communication networks can be constructed utilizing a number of different wireless technologies. For instance, point-to-point microwave radio relay transmission can be used or point-to-multipoint microwave access technologies such as LMDS or WiFi can be used to construct a wireless communication network. Regardless of the particular technology used to construct a wireless communication network, the network can typically employ two or more wireless communication devices, such as wireless routers, to move traffic into, out off and around the network. There are a number of different types of wireless communication network architectures, one type of which is a wireless mesh network. In a wireless mesh network, all of the wireless routers may be able to establish a communication link with any other wireless router within range. Depending on the wireless technology being used, this range can be anywhere from a hundred feet to several hundred feet or more. Packets entering a wireless mesh network are moved from router to router until the packet arrives at its destination. Each wireless router typically includes two or more transceivers and each transceiver will typically be dedicated to operating on only one channel at any particular point in time. However, the wireless routers employed to implement the invention described hereinafter can include transceivers that have the capability of operating on more than one channel.

Figure 1:
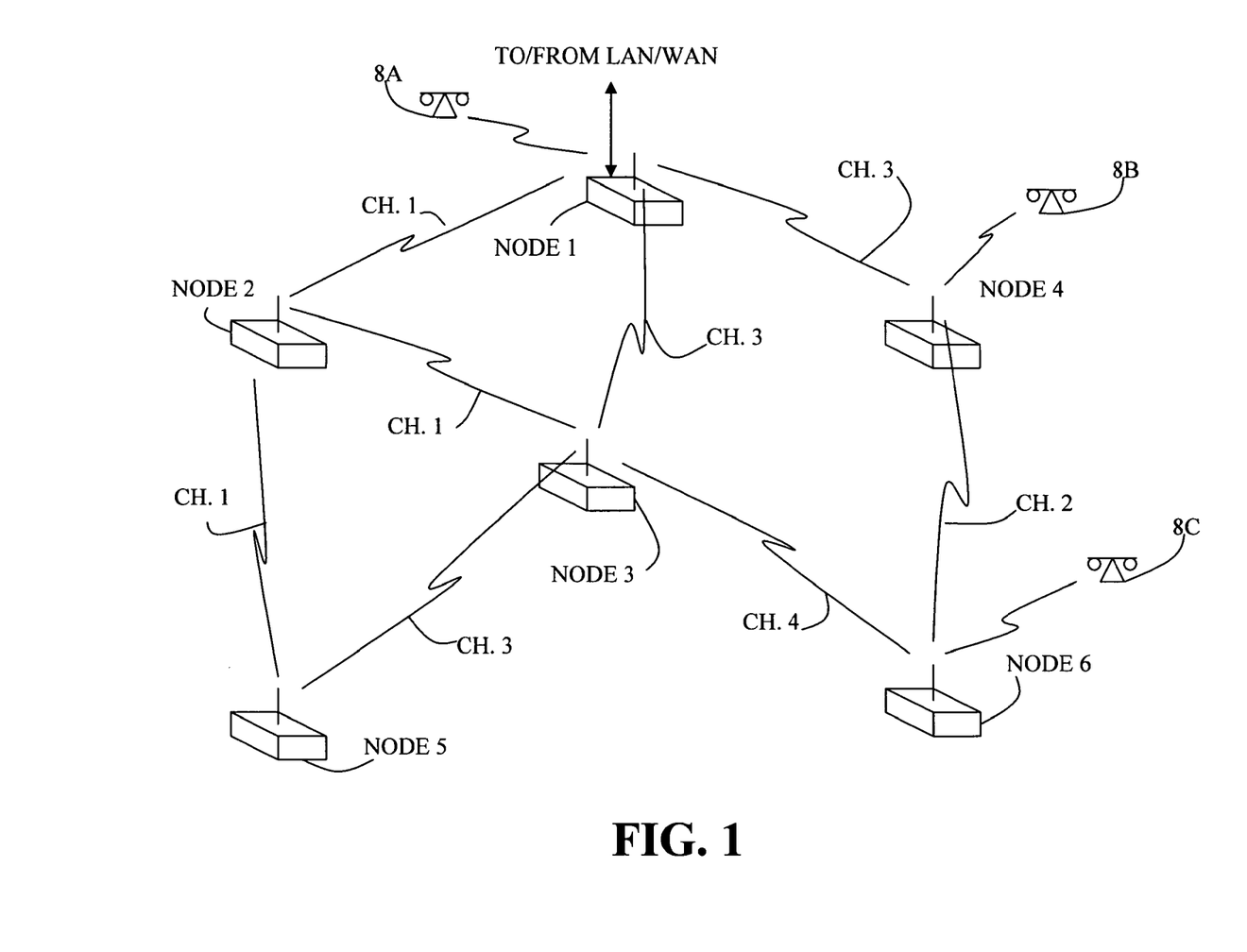
FIG. 1 is a diagram illustrating how wireless routers can be configured in a mesh network and the channel relationships between the wireless routers.

FIG. 1 is a diagram of a typical wireless mesh network showing a number of wireless routers, the communication links on particular channels between each of the routers and client devices that can gain access to certain of the wireless routers. Specifically, a wireless communications network 10 includes six wireless routers which are represented in the FIG. 1 as nodes 1-6. As illustrated in FIG. 1, each of the six wireless routers 1-6 can establish a communication link with one or more other wireless routers using particular communication channels which are represented in this Figure as channels 1, 2, 3, 4 and 20. In the preferred embodiment of the invention, wireless communications network 10 operates according to a protocol specified in the IEEE 802.11 standard, but any wireless communications protocol such as Bluetooth, Zigbee or WiMAX can be used. Although, in the preferred embodiment of the invention, channels that are designated for the transmission of radar signals can be selected, it is more desirable to select channels over which to establish router to router links that do not carry radar signals in order to eliminate this form of interference in the network.

Continuing to refer to FIG. 1, some or all of the wireless routers or nodes 1-6 can be configured to support access by client wireless communication devices such as wireless phones, PDAs or laptop computers, for instance. In this case, node 1, node 4 and node 6 are configured to support access by wireless phones 8*a*, 8*b* and 8*c* respectively. In order to support client devices, the wireless routers include an additional transceiver that is dedicated to receiving packets from and sending packets to the wireless client devices. Finally, the wireless communication network 10 can be connected to another communication network. As shown in FIG. 1, node 1 is connected to another LAN or WAN which, for instance, can be another wireless mesh network or the Internet. Although not shown in FIG. 1, a path distance factor (PDF) is assigned to each of the nodes 1-6. The PDF to node assignments are shown below in Table 1.

TABLE 1

Router 1: PDF = 0
Router 2: PDF = 1
Router 3: PDF = 1
Router 4: PDF = 1
Router 5: PDF = 2
Router 6: PDF = 2

The PDF assigned to each node is equivalent to the nodes distance to the nearest wireless communication network 10 portal, which in this case is node 1. A network portal's PDF value is typically assigned to be "0", but can be assigned a value larger than "0" in the event that it is desirable to give more weight to any particular portal if more than one portal is present in a network. The PDF value can be utilized during a channel selection process in which each wireless router participates each time a mesh forming process is started or the PDF value can be utilized by each node in a wireless communications network in the event that a communication link between two nodes fails or in the event that interference on a communications link rises above a certain threshold level and it is desirable to re-establish the link using a different channel or to switch to a better channel. The channel selection protocol in such cases dictates that the node with the highest priority, i.e., the node with the lowest PDF selects the best channel available at the time that the communications link fails, propagates this channel selection to the nodes within range with lower PDF values, which are termed the children nodes, and the children nodes can then pick the best channel from the channels in a channel pool, and so forth throughout the rest of the mesh network. The channel selection process described above ensures that all of the routers in the wireless communications network 10 converge to an optimal or nearly optimal channel assignment scheme, which results in the traffic through the network being maximized. Also, another aspect of the channel selection protocol described above includes the rule that one node will not select a channel that another node within range is also using unless a communications link is established between the two nodes.

Continuing to refer to FIG. 1, all of the nodes 1-6 in the wireless communications network 10 are continually monitoring for interference on active channels over which they are currently transmitting and receiving and possibly over other channels as well. In the event that the level of interference rises above some pre-determine threshold, a node can try to switch to a different channel to avoid the interference while continuing to transmit and receive traffic on the current channel, or in the event that the interference is such that the communications link between two nodes simply fails, one of the two nodes can select a different channel over which to establish a new link and then initiate a channel switch process. Depending upon whether a link is active or inactive, interference detection by each node 1-6 can be based on a number of different factors. In the event that a link is active, these interference factors can include such parameters as the link quality, which is measured by monitoring parameters like signal strength, signal-to-noise ratio, signal stability and packet jitter for instance, RSSI, retry percentages and possibly some IP level information as well. All of the above four described interference factors are continuously monitored by each of the nodes 1-6 and the results of this monitoring are stored in a memory included in each node.

Continuing to refer to FIG. 1, in the event that a link is inactive other interference factors have to be detected. One interference factor or parameter that is considered is the non-802.11 traffic base noise level. This noise level is dynamic and each node's low level noise calibration process is continually calibrated so that the base non-802.11 noise level is continually available. Another factor that can be considered when detecting interference is the clear channel assessment (CCA) idle percentage changes. Each node periodically senses the medium to determine whether a channel is "clear", or not in use by some other device, and can be used to transmit traffic. To the extent that any channel is not "clear", this measure can be used as an indication that both 802.11 interference and non-802.11 interference may be present on the channel. So in other words, if the idle percentage on any particular channel is high, this is an indication that the channel has a low level of interference, and vise versa. Another factor that can be considered in detecting interference is the status of management frame transmission. In the event that a particular channel has a high level of interference, it may not be possible for a node to transmit management frames, such as a beacon or probe response frame. Each node 1-6 in the wireless communications network 10 can monitor its management frame transmission failure rate and depending upon the magnitude of the failure rate a node can decide that the interference level is high. Finally, the data traffic transmission status of each node can be monitored, and if the data traffic transmission failure rate (percentage of packets that fail to arrive) rises above some threshold level, which in the preferred embodiment can be between five and fifteen percent but can be set to any desirable level, a node may determine that interference is high enough to warrant trying to switch to another channel or the link may simply fail and the node is then forced to select another channel that it can switch to.

In one aspect of the preferred embodiment of the invention, a network node in FIG. 1, node 1 for instance, can monitor its communications link with another node, node 2 for instance, in order to detect an 802.11 management message periodically transmitted by node 2. This periodic management message can be a beacon, for instance, which is transmitted by all nodes at regular intervals in order to maintain a previously established communication link which in this case is established over channel 1. The period of the transmission interval can be equivalent to one message every 100 msec, for example. If node 1 does not receive one or more of these periodically transmitted messages from node 2, or if node 1 does not receive at least one of these periodically transmitted messages for some predetermine period of time, node 1 then initiates an interference detection process during which the interference factors for each channel, described in the previous paragraph, are examined and the process determines whether or not there are other more acceptable channels to switch to in order to avoid the interference. By employing this particular method to detect interference, no additional channel bandwidth is employed by node 1 and traffic though node 1 is not interrupted. The process by which this interference detection process is initiated and the interference avoidance process is conducted will be described in greater detail with reference to FIG. 3 and FIG. 4 respectively. However, in the event that interference on the link between nodes 1 and 2 rises to a level which results in the unexpected failure of channel one, the assumption is made that the channel has failed, channel 1 in this case, is experiencing a level of interference that renders is not useable. In this case, the best available alternative channel can be detected by sensing the medium for clear channels and a new communication link between node 1 and node 2 is established using the best available alternative channel. In this case, since the link is down, passively sensing the medium for available channels will not interfere with the flow of traffic through the node. The process by which this interference detection and avoidance process is conducted will be described in greater detail with reference to FIG. 5.

As described above in the previous paragraph, the preferred embodiment of the invention is a hybrid approach to interference detection and avoidance. In the event that interference is detected and a communication link is active between two nodes, the invention enables alternative channels to be selected and switched to without the utilization of additional bandwidth and without the disruption in the flow of traffic between the two nodes, and in the event that a communications link between two nodes unexpectedly becomes inactive, the invention takes advantage of this disruption in the flow of traffic to passively sense the medium for suitable channels to switch to. Among other things, by employing this channel switch strategy, the disruption to the flow of traffic through a wireless communications network can be minimized resulting in the most efficient use of network bandwidth. This approach to interference detection and avoidance combines the benefits of maintaining the flow of traffic if the communications link is still active and taking advantage of the cessation in the flow of traffic to passively scan the medium in order to detect and report real interference data on all channels.

Figure 2:
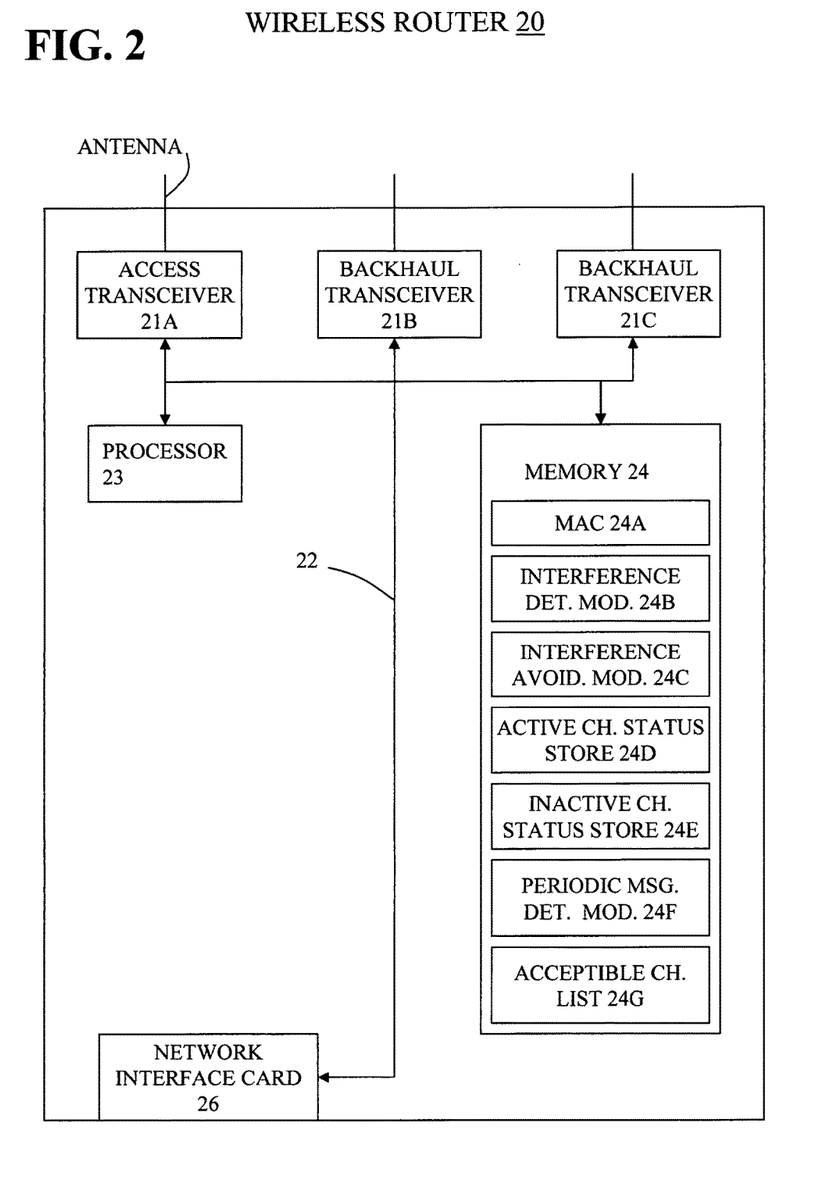
FIG. 2 is a functional block diagram of a wireless router suitable for use in a mesh network.

FIG. 2 is a high level diagram illustrating the functional blocks included in any one of the wireless communication network 10 nodes 1-6, which for the purpose of describing FIG. 2 will be referred to as wireless router 20, that are essential to the operation of the preferred embodiment of the invention. Wireless router 20 includes three transceivers 21A, 21B and 21C. An access transceiver 21a operates to permit access to the wireless communications network 10 by a client wireless device such as a wireless phone and two backhaul transceivers 21B and 21C operate to transport traffic around the wireless communications network 10. All three transceivers are connected over a bus 22 to a processor 23 and a memory 24. The processor 23 generally operates in conjunction with software stored on memory 24 to enable certain wireless router operations needed to transport traffic from one node on the network to another node and to perform the interference detection and avoidance operations enabled by the invention. Memory 24 includes a medium access control (MAC) module 24a that generally operates to initiate and terminate a communication link and to format information into frames for transmission over the link to another network node. Memory 24 also includes an interference detection module (IDM) 24B and an interference avoidance module 24C. The interference detection module (IDM) includes two functions, a first IDM function A which operates to detect and store, in active channel status store 24D, interference factors that are "observable" when a communication link between two nodes is active and a second IDM function B that operates to detect and store, in inactive channel status store 24E, interference factors that are "observable" when a communication link between two nodes is inactive. More specifically, during the time that a link between two nodes is active, one or both of the nodes can employ the IDM function A to "transparently" detect and store certain indications of the presence of interference on this link. These indications or interference factors can be such things as the quality of a link, as measured by any lost frames, the level of the received signal strength indicator, frame retry percentage, and some IP level information. Conversely, in the event that the link is inactive, one or both of the nodes can employ the second IDM function B to passively sense the medium to detect certain indications of the presence of interference on a number of different channels. These indications or interference factors can be such things as the change in the value of a base noise level as continually measure at the node, or the CCA idle percentage, or the status of management and data frame transmission. All of these factors are described above with reference to FIG. 1. Finally, both the first and second IDM functions A and B periodically evaluate the contents of stores 24D and 24E respectively for acceptable channels and then create a listing of these acceptable channels in list 24G.

Continuing to refer to FIG. 2, memory 24 also includes an interference avoidance module (IAM) 24C. According to the preferred embodiment of the invention, this module 24C includes two functions. A first IAM function A which operates on the interference factor information detected and stored in active channel status store 24D by the first IDM function A, when a communications link is active. As the result of operating on this information, the first IAM function A can determine that an interference level is such that a channel switch can or should take place. The first IDM function A also generally operates to enforce a hierarchical channel switch decision tree based upon a PDF value, it operates to generate a channel switch request message and a channel switch decision message, and it operates to select the optimum channels from list 24G that the node should switch to in order to most efficiently utilize the network bandwidth. A second IAM function B operates, when a communications link is inactive, to cause the node to passively monitor the medium looking for channels with acceptable levels of interference to use in order to establish a link and to store this channel interference information. As the result of operating on this information, the second IDM function B generally operates to enforce a hierarchical channel switch decision tree based upon a PDF value, it operates to generate a channel switch request message and a channel switch decision message, and it operates to select from list 24G the optimum channels that the node should switch to in order to most efficiently utilize the network bandwidth. This hybrid interference detection method atrategically takes advantage of the different states of communication links between two nodes to minimize the effect on data forwarding performance network wide. Specifically, this hybrid interference detection method employs an existing, periodically transmitted message to detect channel interference while a communication link is active and employs a passive, sensing approach to detecting interference while a communication link is inactive. The hybrid interference detection process of the invention will now be described in more detail below with respect to FIGS. 3A and 3B and the hybrid interference avoidance process will be described later in more detail with respect to FIGS. 4A, 4B and 4C and FIGS. 5A and 5B.

As mentioned above, FIG. 3A is a logical flow diagram of the interference detection method of the invention that is employed while a communications link is active. In step 1, after a node, node 5 in FIG. 1 for instance, is turned on and has been assigned a PDF number, which PDF number in this case is 2, node 5 determines whether a communications link on channel 1 for example between itself and node 2 is active. If this link is active then the process proceeds to the logical path starting with step 2, if not the process proceeds to FIG. 5A, step 1. Proceeding first to the path starting with step 2 in FIG. 3A, both node 5 and node 2 employ the periodic message detection module 24F of FIG. 2 to monitor the medium for the periodically transmitted 802.11 management messages referenced earlier with reference to FIG. 1. The periodic message detection module 24F operates to detect and store in the active channel status store 24D information contained in these messages relating to the status of each active channel. Hereinafter these periodically transmitted management messages will be referred to simply as periodic messages. As previously mentioned, the status of each active channel can be determined by examining the link quality, the RSSI, the retry percentage and certain IP level information also included in these periodic messages. In step 3, and in the preferred embodiment of the invention, if node 2 detects three sequentially missing periodic messages on channel "1", then the process proceeds to step 4, otherwise the process loops back to step 2. After node 2 detects missing periodic messages in step 3, in step 4 its interference detection module 24B is initialized and in step 5 the interference detection module 24B compares, for each possible channel other than channel "1", the information contained in the active channel status store 24D against pre-determined threshold values and if some or all of the levels associated with particular channels in the store, when compared to the pre-determined threshold levels, are determined to have less that the maximum amount of acceptable interference, the process proceeds to step 6 of FIG. 3B and these channels are stored in list 24G of FIG. 2. Otherwise, the process proceeds to step 10 in FIG. 3B, where the channel is ignored and the process returns to step 5 in FIG. 3A.

Figure 3A:
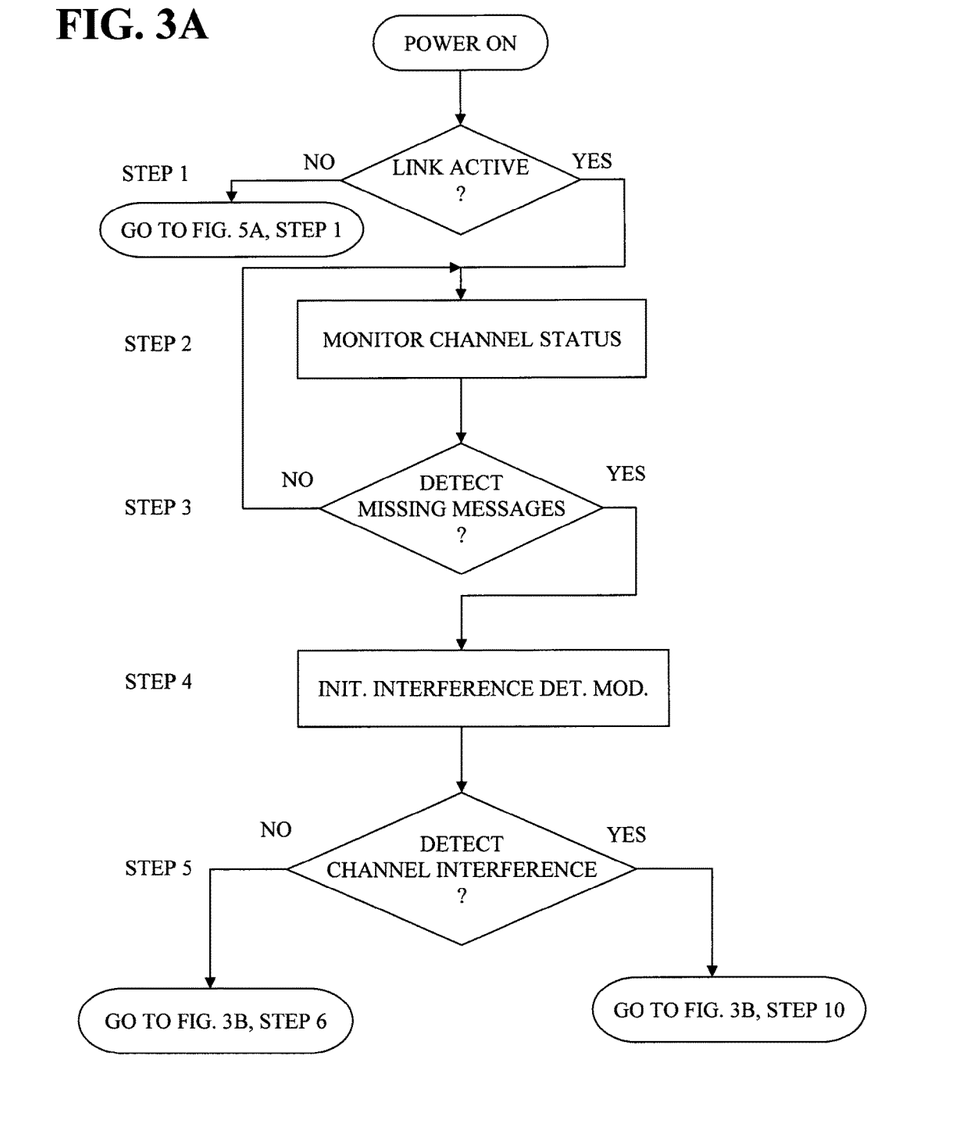
FIG. 3A is a logical flow diagram of the process of the invention for detecting interference in an active link.
Figure 3B:
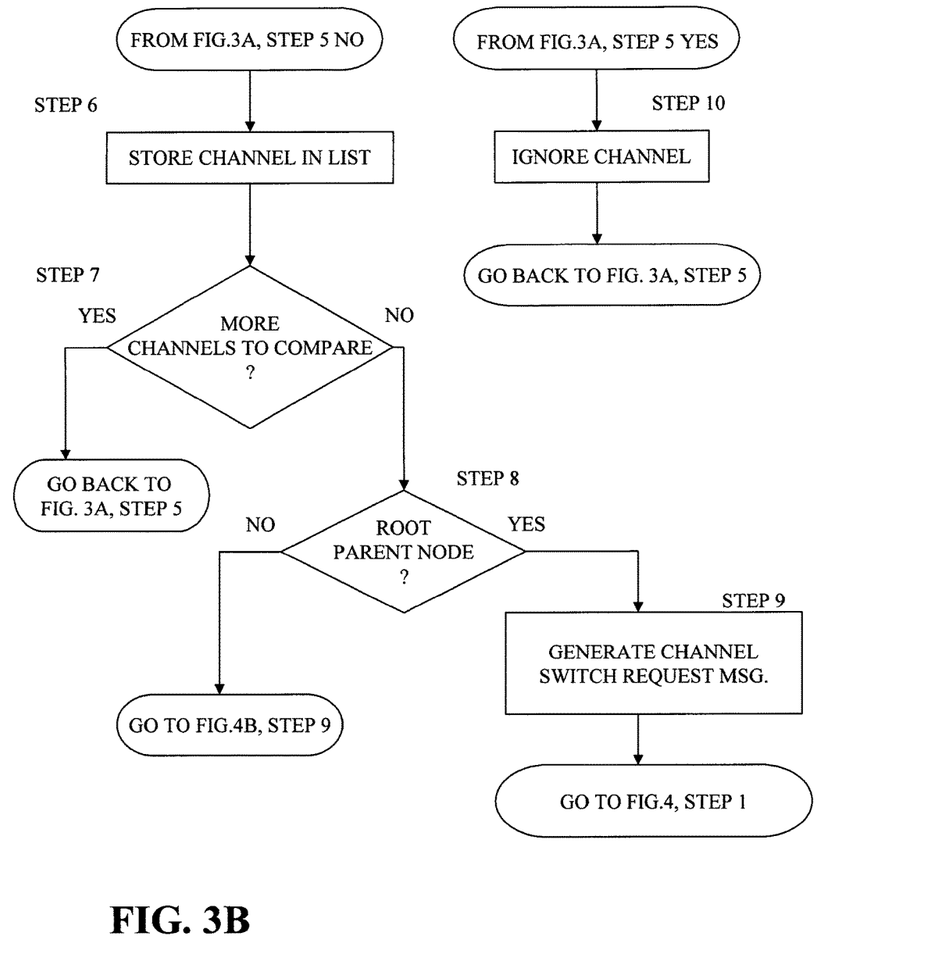
FIG. 3B is continuation of the flow diagram of FIG. 3A.

Referring now to FIG. 3B, if in step 7, all of the channels have been analyzed for interference, the process proceeds to step 8 otherwise the process returns to step 5 in FIG. 3A. In step 8, the IDM 24B for node 2 determines whether there are any parent nodes associated with node 2. If node 2 has parent nodes, the process proceeds to step 9 and node 2 generates a channel switch request message and includes in the message those channels, other than channel "1", that are determined to be acceptable in the listing of acceptable channels 24G of FIG. 2. After generating the channel switch request message, the process proceeds to step 1 in FIG. 4A. If, in step 8 of FIG. 3B, it is determined that there are no parent nodes associated with node 2, then the process proceeds to step 9 in FIG. 4B.

Figure 4A:
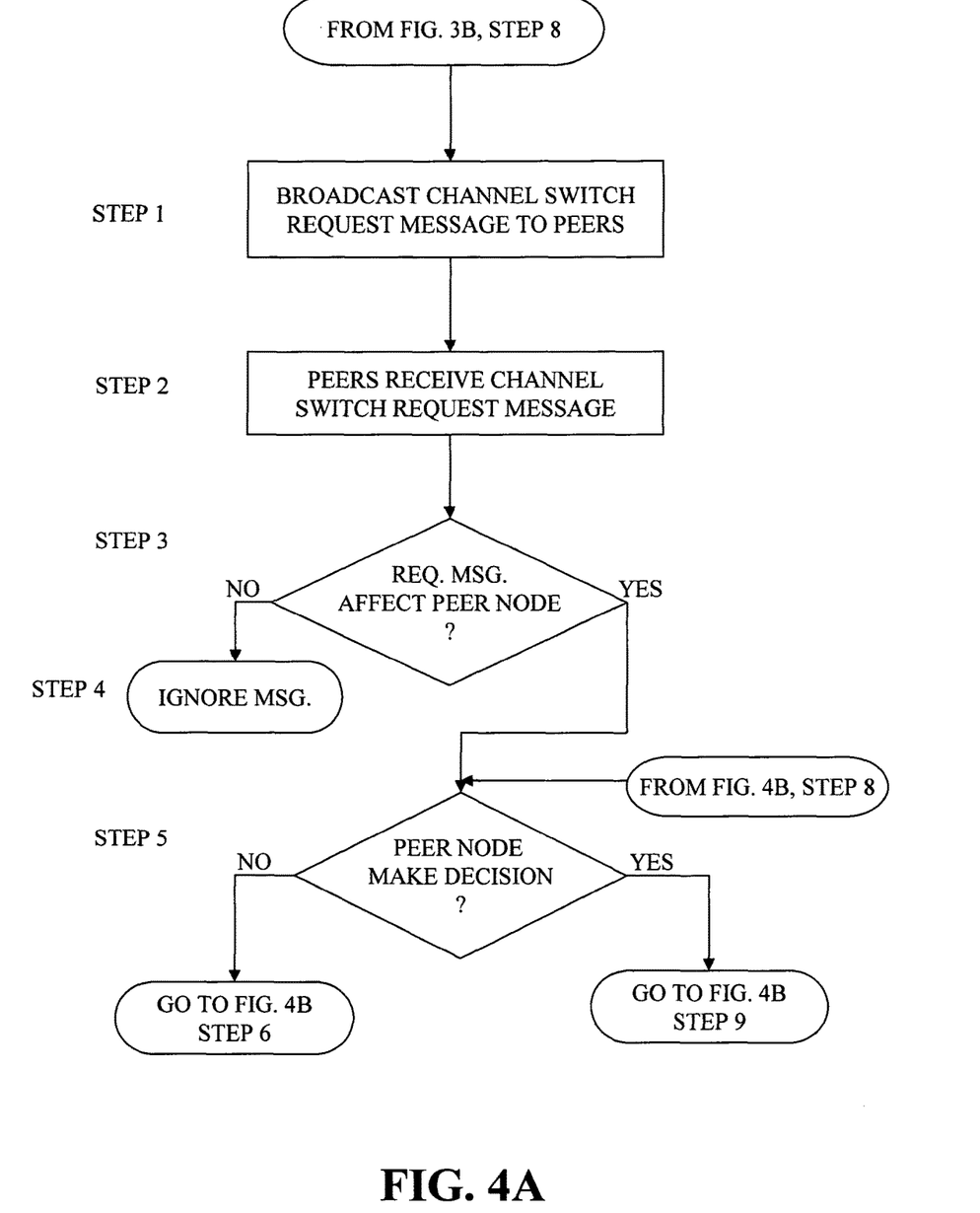
FIG. 4A is a logical flow diagram illustrating the process of the invention for avoiding interference while a communication link is active.

Referring now to FIG. 4A, which is a logical flow diagram of the interference avoidance process employed in the preferred embodiment of the invention in the event that the communications link between two nodes is active. In step 1 of FIG. 4A, node 2 employs the interference detection module 24C of FIG. 2 to broadcast the channel switch request message generated in step 9 of FIG. 3A over channel "1" to all peer nodes within range, which in this case are node 5, node 3 and node 1. In step 2, nodes 5, 3 and 1 receive this channel switch request message and in step 3 they employ their respective interference avoidance modules to determine whether or not the channel switch request will affect them or not. In other words, all the nodes that receive the channel switch request message analyze whether the lose of channel "1" will affect its ability to move backhaul traffic through the network. So for example, node 3, not being in the direct backhaul path between nodes 1 and 5 may come to the determination that switching from channel "1" to another channel will have no effect on its ability to route traffic through the network since it may not be currently sending any traffic to node 1. In this case node 3 in step 4 will simply ignore the channel switch request message. On the other hand, node 5 may come to the determination in step 5 that a switch away from channel "1" will effect its ability to forward backhaul traffic through the network as the loose of channel "1" will break its communication link with node 2, which in this case would be routing backhaul traffic to node 5. In this event the process proceeds to step 5 where nodes 1 and 5 employ their interference avoidance module 24C to determine if they can make the channel switch decision themselves. Each of the nodes 1 and 5 determines whether or not it can make the channel switch decision by itself by examining its routing table to see if it has a parent node, which can be a node with which it is currently communicating that has a smaller PDF value. If either node 1 or 5 finds a parent node, then it cannot make the switch decision itself and the process proceeds to step 6 in FIG. 4B.

Figure 4B:
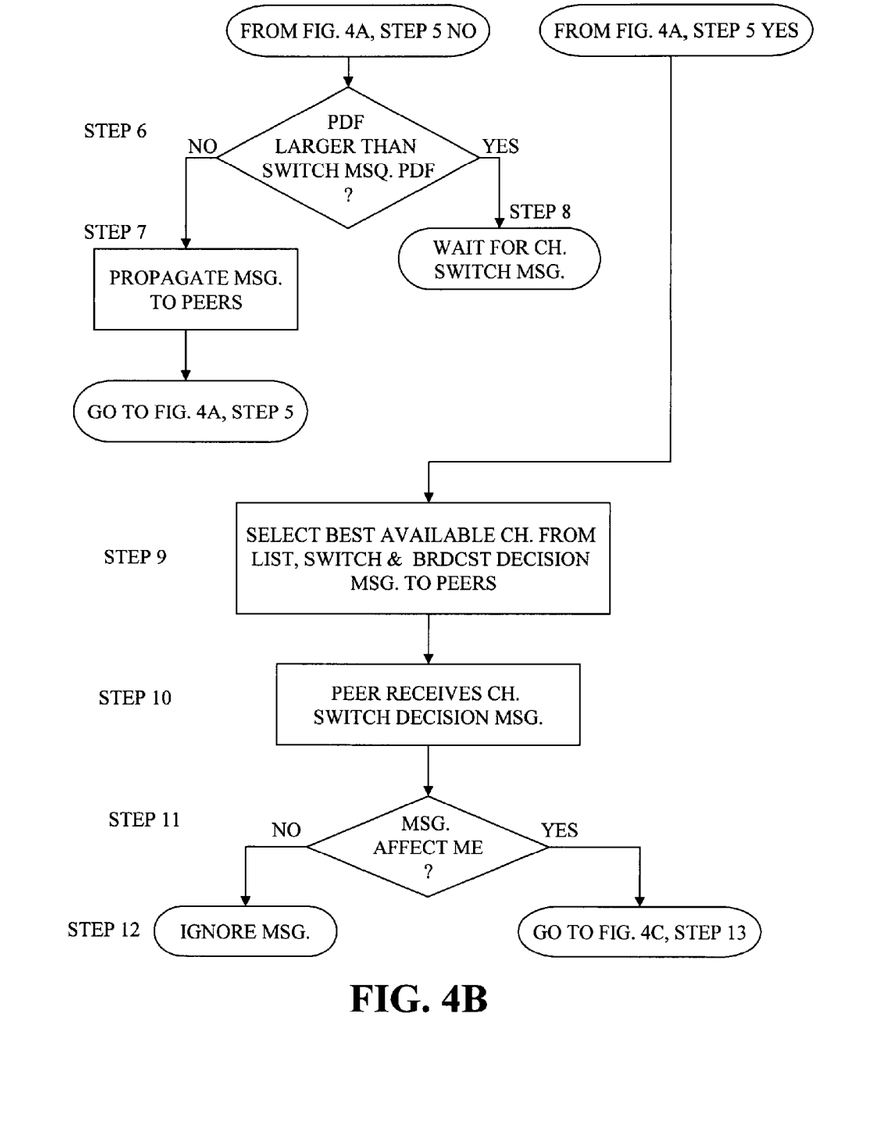
FIG. 4B is a continuation of the flow diagram of FIG. 4A.

Referring now to FIG. 4B, in step 6 if node 5 examines the PDF value in the channel switch request message it received from node 2 and comes to the determination that the PDF value contained in the message is larger than the PDF valued assigned to it, then the process proceeds to step 8 where node 5 simply waits for a channel switch decision message. Otherwise, if the PDF value is smaller, in step 7 the node will propagate the channel switch request message to peer nodes and the process will return to step 5 in FIG. 4A.

Continuing to refer to FIG. 4B, in step 9 of the process, node 1 will employ its interference avoidance module 24C of FIG. 2 to examine the channel switch request message for the list of acceptable channels and will select the best channel, channel "20" for instance, from among all channels in the list to switch to. This decision is based upon a number of factors including the level of interference present on the channel and whether or not the channel will allow the routers that are affected by the switch to convert to the most efficient bandwidth utilization scheme. Node 1 in this case, after having selected the channel it switches to will generate a channel switch decision message and broadcast this message to all peer routers within range. This message includes a notification that node 1 is switching to channel "20". The peer nodes, such as node 2 in step 10, receives the channel switch decision message and in step 11 determines whether or not establishing a link with node 1 over channel "20" will affect it. In this case, changing the channel from channel "1" to channel "20" will have an affect on the link between node 1 and node 2 and so the process will proceed to step 13 in FIG. 4C. Otherwise, in the event that changing channels will have no affect, the process proceeds to step 12 in FIG. 4B and the node will simply disregard the message.

Figure 4C:
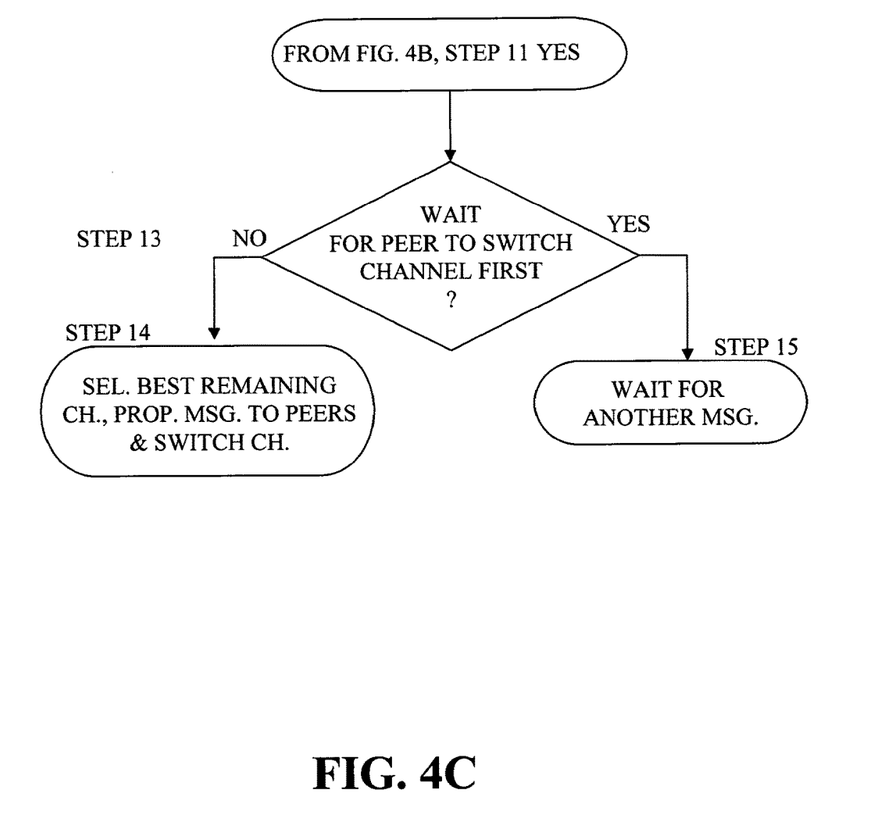
FIG. 4C is a continuation of the flow diagram of FIG. 4B.

Referring now to FIG. 4C, in step 13, node 2 in this case will determine whether it has to wait for any parent nodes to switch channels before it can perform the channel switch operation. This determination is important because the link between the parent node and the child node should not be ended until the parent node makes the channel switch. In the event that node 2 determines it needs to wait, the process proceeds to step 15 and node 2 waits for another channel change decision message, otherwise the process proceeds to step 14 where node 2 selects the best remaining channel to switch to, channel "22" for instance, propagates the channel switch decision message to its peers and makes the switch to channel "22".

Figure 5A:
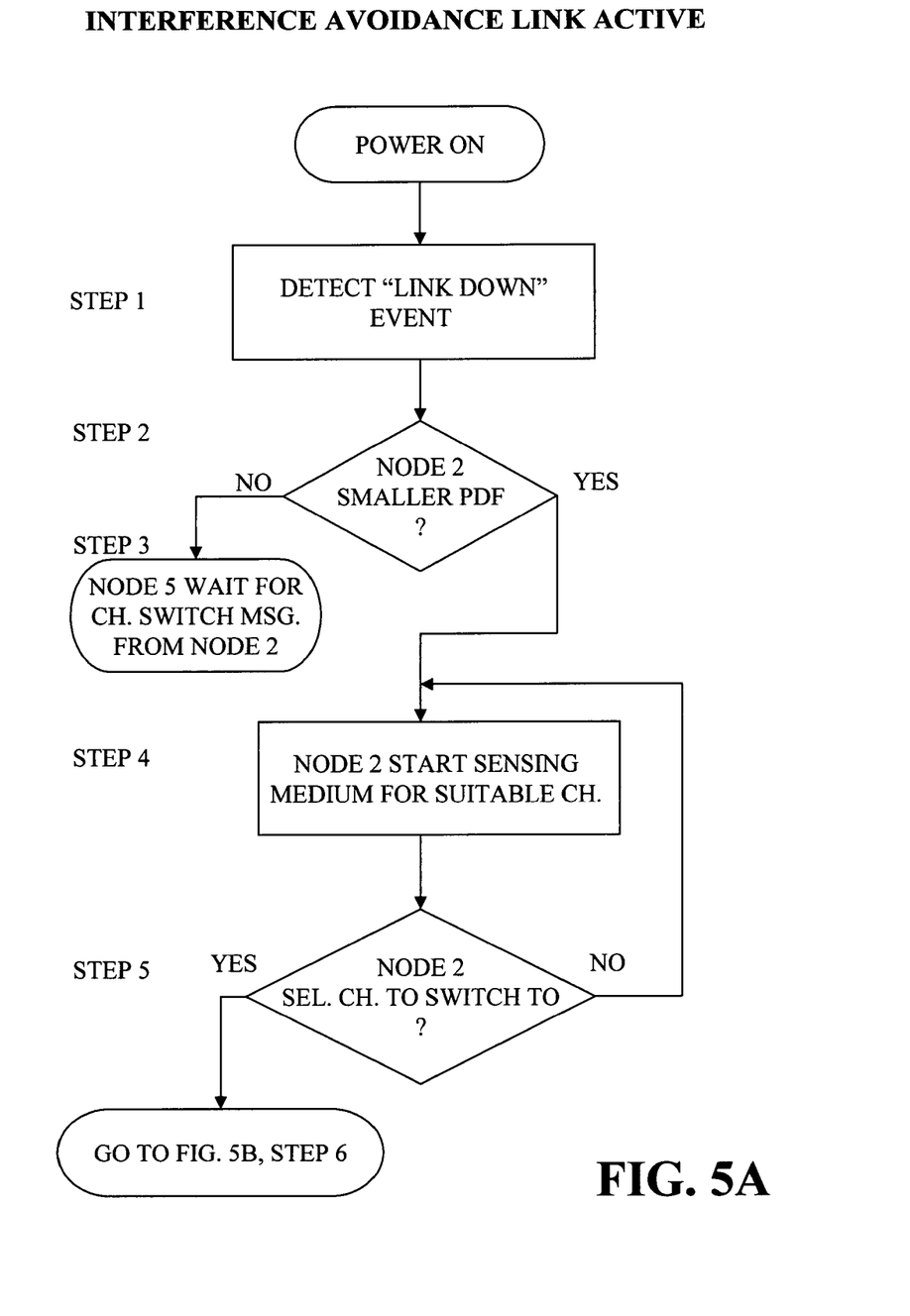
FIG. 5A is a logical flow diagram illustrating the process of the invention for avoiding interference while a communication link is inactive.

Referring now to FIG. 5A, which is a logical flow diagram of the interference avoidance process used in the preferred embodiment of the invention in the event that the communications link between two nodes is inactive. In step 1, if a "link down" event is detected by the interference detection modules 24C on node 5 and node 2 of FIG. 1, the process proceeds to step 2. A "link down" event is typically generated when a node detects that the channel on which it is communicating with another node unexpectedly fails. In step 2, if the interference detection module on node 2 determines that its PDF value is smaller than the PDF value assigned to node 5, the process for node 2 proceeds to step 4. On the other hand, in step 2, if the interference detection module on node 5 determines that the node 5 PDF value is higher than the PDF value assigned to node 2, the process for node 5 proceeds to step 3 and node 5 simply waits for a channel switch decision message from node 2. In the event that the PDF values for nodes 2 and 5 are the same, other parameters such as a node-id can be used to determine which node initiates a passive scanning process in step 4. Returning to step 4, node 2 employs the interference detection module 24C of FIG. 1 to start passively sensing the medium on one or more channels looking for acceptable channels to switch to. This process involves the detection and storing, in inactive channel store 24E of FIG. 2, of the interference factors or parameters described earlier with reference to FIG. 1. Also, in step 4, the interference avoidance module 24C builds a listing of channels that exhibit interference parameters that would permit a communications link to be established between two nodes and stores this listing in acceptable channel listing 24G in FIG. 2. At this point, the process proceeds to step 5 and the interference avoidance module 24C in node 2 determines whether there are any acceptable channels in the listing 24G. In this case, the interference avoidance module 24C in node 2 determines that there are acceptable channels to switch to and the process can proceed to step 6 of FIG. 5B. On the other hand, if node 2 determines that there are no acceptable channels to switch to, then the process returns to step 4 and the interference avoidance module 24C on node 2 continues to sense the medium looking for acceptable channels.

Figure 5B:
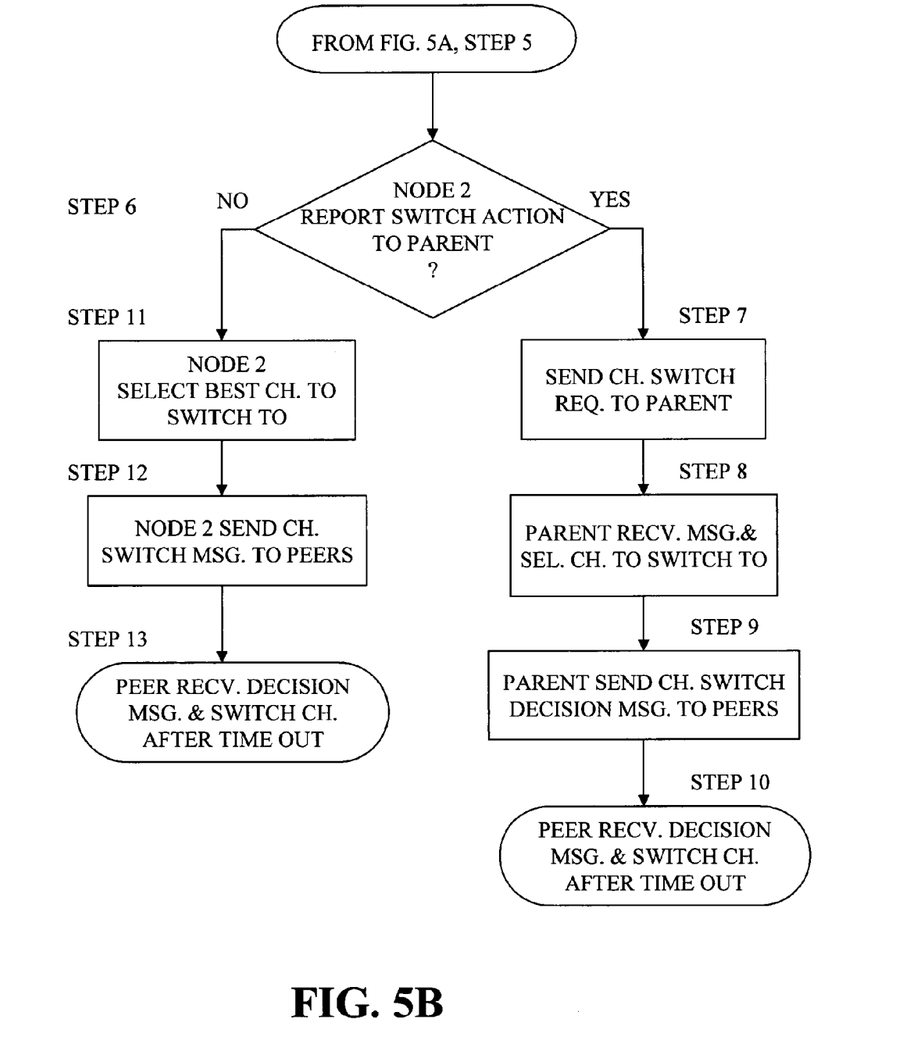
FIG. 5B is a continuation of the flow diagram of FIG. 5A.

Referring now to FIG. 5B, in step 6, the interference avoidance module 24C on node 2 determines whether there are any parent nodes that it needs to report its decision to perform a channel switching action to. Parent nodes are those nodes, which node 2 is associated with that have smaller PDF values than node 2. In this case, node 1 is a parent node to node 2 and so in step 7, node 2 sends a channel switch request message to node 1 that includes a listing of all the acceptable channels and waits to receive a channel switch decision message. On the other hand, if there are no parent nodes, then the process proceeds to step 11. Returning to step 7, parent node 1 receives the channel switch request message from node 2 and selects the best channel to switch to as described earlier with reference to FIG. 4. In step 9, the interference avoidance module 24C in node 1 generates a channel change decision message, which can be an 802.11 beacon or action frame, which includes a notification of the channel to which it is switching and a listing of the remaining channels that are available to other nodes to select from, sends this message to peer routers within range and node 1 switches to the selected channel after waiting a timeout period. In step 10, nodes 2 and 5 will eventually receive the channel switch decision message transmitted by node 1 and make decisions as to which channel to switch after waiting a timeout period.

Continuing to refer to FIG. 5B and returning to step 11, in the event that node 2 does not have a parent node, the interference avoidance module 24C in node 2 determines which channel is the best channel to switch to and in step 12 generates and sends a channel switch decision message to peer nodes within range and in step 13 switches to the selected channel after a timeout period. In step 13, the peer nodes within range receive the channel switch decision message from node 2 and proceed accordingly.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory medium comprising instructions which, when executed by a processor cause the processor to:
   responsive to a detection that an interference value is above a threshold value for a first channel, receive, by a device, a channel switch request;
   responsive to receiving the channel switch request:
      determine, at the device, whether switching channels affects an ability to transmit backhaul traffic through the device; and
      responsive to a determination that switching channels affects the ability to transmit the backhaul traffic, select, by the device, a second channel to use to communicate with one or more devices instead of the first channel; and
   based on the selection of the second channel by the device: use, by the device, the second channel for communication with the one or more devices.

2. The medium of claim 1, wherein the device is a root parent node in a mesh network.

3. The medium of claim 1, wherein
   the instructions executed by the processor to select the second channel, by the device comprise instructions executed by the processor to:
      select the second channel for communication by each node among a plurality of mesh nodes.

4. The medium of claim 1, further comprising instructions executed by the processor to:
   responsive to detecting an absence of a regularly occurring signal for a particular period of time, initiate an interference detection process, wherein detecting the interference value above the threshold value on the first channel is performed during the interference detection process.

5. The medium of claim 1, wherein the device is one of the one or more devices.

6. The medium of claim 1, further comprising instructions executed by the processor to:
   subsequent to selecting the second channel, transmit a message, by the device to the one or more devices, identifying the second channel.

7. The medium of claim 1, wherein the instructions to select the second channel include instructions to select the second channel based at least on an interference level detected for the second channel.

8. A system comprising:
a device to:
  determine, responsive to receiving a channel switch request based on a detection of an interference value associated with a first channel being above a threshold value, whether switching channels affects an ability to transmit backhaul traffic through the device;
  determine whether the device is able to make a channel switch decision; and
  responsive to a determination that switching channels affects the ability to transmit the backhaul traffic and that the device is able to make the channel switch decision, select, by the device, a second channel for the device to communicate with one or more devices instead of the first channel.

9. The system of claim 8, wherein the device is a root parent node in a mesh network.

10. The system of claim 8, wherein the device selects the second channel for communication by each node of a plurality of mesh nodes.

11. The system of claim 8, further comprising the device to:
responsive to detecting an absence of a regularly occurring signal for a particular period of time, initiate an interference detection process, wherein detecting the interference value above the threshold value on the first channel is performed during the interference detection process.

12. The system of claim 8, wherein the device is one of the one or more devices.

13. The system of claim 8, further comprising the one or more devices to: receive from the device, subsequent to selecting the second channel, a message, identifying the second channel.

14. The system of claim 8, wherein selecting the second channel is based at least on an interference level detected for the second channel.

15. A method comprising:
responsive to detecting an interference value above a threshold value for a first channel, receiving, by a device, a channel switch request;
responsive to receiving the channel switch request:
  determine, at the device, whether switching channels affects an ability to transmit backhaul traffic through the device; and
  responsive to a determination that switching channels affects the ability to transmit the backhaul traffic, selecting, by the device, a second channel for the device to use to communicate with one or more devices instead of the first channel;
based on the selection of the second channel by the device, using, by the device, the second channel for communication with the one or more devices.

16. The method of claim 15, wherein selecting the second channel includes selecting the second channel for communication by a plurality of mesh nodes in a mesh network, the plurality of mesh nodes comprising the one or more devices.

17. The method of claim 15, further comprising:
responsive to detecting an absence of a regularly occurring signal for a particular period of time, initiating an interference detection process, wherein detecting the interference value above the threshold value on the first channel is performed during the interference detection process.

18. The method of claim 15, wherein the device is one of the one or more devices.

19. The method of claim 15, further comprising: subsequent to selecting the second channel, transmitting a message, by the second device to the one or more devices, identifying the second channel.

20. The method of claim 15, wherein selecting the second channel includes selecting the second channel based at least on an interference level detected for the second channel.

* * * * *